(12) United States Patent
Fidric et al.

(10) Patent No.: US 6,424,663 B1
(45) Date of Patent: Jul. 23, 2002

(54) POWER MONITOR FOR FIBER GAIN MEDIUM

(75) Inventors: Bernard Fidric, Cupertino; Steven Sanders, Belmont, both of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/375,841

(22) Filed: Aug. 16, 1999

(51) Int. Cl.$^7$ ................................................ H01S 3/067
(52) U.S. Cl. ........................................................ 372/6
(58) Field of Search ............................................. 372/6

(56) References Cited

U.S. PATENT DOCUMENTS

| | | | |
|---|---|---|---|
| 4,856,864 A | * | 8/1989 | Campbell et al. ........ 350/96.16 |
| H1426 H | * | 4/1995 | Toeppen ...................... 374/32 |
| 5,418,882 A | * | 5/1995 | Ortiz, Jr. ..................... 385/124 |
| 5,475,235 A | | 12/1995 | Phillips et al. |
| 5,530,709 A | * | 6/1996 | Waarts et al. ................... 372/6 |
| 5,579,328 A | * | 11/1996 | Habel et al. ................... 372/31 |

* cited by examiner

*Primary Examiner*—Paul Ip
*Assistant Examiner*—Jeffrey Zahn
(74) *Attorney, Agent, or Firm*—Kudirka & Jobse, LLP (57) ABSTRACT

A fiber optic gain system has output power monitoring and control using the detected level of side light emitted through the cladding of the gain fiber. The fiber is wound on a spool that is provided with an opening adjacent to the fiber cladding. A photodetector is mounted to the spool at an opposite side of the opening, and detects side light that is transmitted through the opening. An output signal from the photodetector is indicative of the output power or the gain of the system, and may be used for monitoring and/or to adjust the power generated by a pumping source for the system. This allows feedback control of the system that helps to stabilize the output power or gain. A filtering element may also be used to exclude certain undesired wavelengths from the side light being detected.

32 Claims, 5 Drawing Sheets

POWER MONITOR FOR FIBER GAIN MEDIUM

FIELD OF THE INVENTION

This invention is related, generally, to the field of fiber optic lasers and amplifiers and, more specifically, to monitoring the output power of such devices.

BACKGROUND OF THE INVENTION

Fiber optic lasers are known in the art, and are used as coherent optical sources for a number of applications. Similarly, fiber optic amplifiers are known, and are used for boosting the power of a desired optical signal. Both of these devices may use a similar gain mechanism. An optical fiber, often doped with an active material such as a rare earth element, is "pumped" by coupling optical energy into it at a predetermined wavelength. The pumping wavelength is selected according to the characteristics of the fiber, such as an absorption band of a particular dopant that has been used. Pumping energy coupled into the fiber is absorbed, causing a population inversion in the doped material that is followed by optical radiation at a predetermined wavelength. Amplifiers typical rely on the stimulated emission of radiation at the wavelength of a signal input to the fiber. For a fiber laser, the fiber core is provided with reflective ends, such that a resonance condition develops within the fiber cavity. An output coupler, being only partially reflective, allows the output of the developed laser energy. Typically, a wavelength-stabilizing element is used to enhance reflectivity at a desired output wavelength, and thereby select the output wavelength of the laser.

Many fiber optic lasers and amplifiers use a fiber with a single cladding layer, and couple the pumping energy of the laser directly into the fiber core. Alternatively, the fiber may be a double-clad fiber in which the core is surrounded by two different cladding layers, an inner or "pump" cladding surrounding the core, and an outer cladding surrounding the pump cladding. Fibers of this configuration may be pumped by injecting the optical pump energy into the pump cladding layer of the fiber. The pump energy repeatedly encounters the core of the fiber as it undergoes internal reflection within the pump cladding layer, and is absorbed by the dopant of the core, providing the desired population inversion. The use of a double-clad fiber typically allows the coupling of a greater amount of pump energy into the gain medium than is possible with a single-cladding fiber. As such, double-clad fiber lasers are desirable for higher power applications.

To maintain a consistent operation of a fiber laser or amplifier, it is desirable to monitor the output power. This allows fluctuations in the output power to be compensated for by adjusting the pumping power level. In this way, an effective feedback arrangement may be constructed to help maintain a stable output power. To accomplish this, present systems use a low reflectivity beam splitter/photodiode combination located in the termination optics, that is, at the end of the gain medium. These power "taps" allow a certain fraction of the output light to be monitored, and thereby provide an indication of the total output power. However, the use of these devices is costly both monetarily and in the loss of system power. Moreover, they tend to be susceptible to environmental conditions and the particular handling by a system user.

SUMMARY OF THE INVENTION

In accordance with the present invention, an optical gain system includes a photodetector that monitors side light emitted through the cladding of the fiber. The detected side light is indicative of the output power of the gain system, and may be used to monitor and control that output power. The gain system is preferably a fiber optic laser or a fiber optic amplifier, and includes an optical fiber and a pumping source that generates optical pumping energy and couples it into the fiber. The detected side light may include optical energy at the signal wavelength, at the pump wavelength or both, and the desired wavelengths may be selected with a filter located between the fiber and the detector. The fiber may have a single cladding, but is preferably double clad, having an inner cladding, into which the pumping energy is. coupled, and an outer cladding. The fiber also has a gain characteristic at a signal wavelength, that is, it generates optical signal energy at the signal wavelength in response to the pump energy. In particular, the fiber core may be doped with at least one active element, such as ytterbium. Alternatively, the fiber core may contain no active element, but provide gain by Raman amplification.

In a preferred embodiment, the fiber is wound on a spool that has an opening adjacent to the fiber. The photodetector is positioned at the end of the opening opposite the fiber so as to receive side light that exits the fiber through the cladding and passes through the spool opening. The photodetector generates a control signal indicative of the side light power level, and outputs the signal to a controller. The controller controls the pumping source, and responds to changes in the control signal by adjusting the power output from the pumping source to the fiber such that the detected side light is maintained at a substantially constant power level. For example, if the power level of the detected side light increases, the controller adjusts the pumping source so as to reduce the amount of pumping energy coupled into the fiber. Similarly, if the power level of the detected side light decreases, the controller adjusts the pumping source so as to increase the amount of pumping energy coupled into the fiber.

The side light used to control the system is preferably at the signal wavelength, although light at the pump wavelength may also be used instead of, or in addition to, the signal light. A filter or filters may be used to control the light reaching the photodetector, and may also serve to remove other, unwanted wavelengths.

DETAILED DESCRIPTION OF A PREFERRED EMBODIMENT

Figure 1:
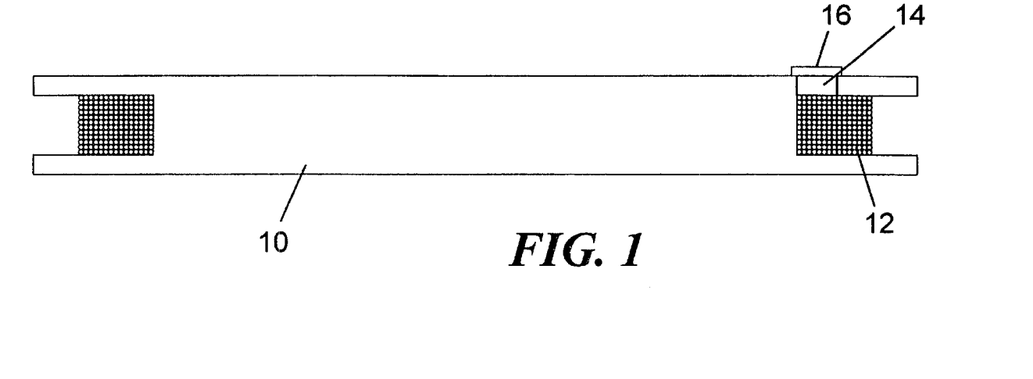
FIG. 1 is a cross-sectional side view of the spool, fiber and photodetector of a fiber laser system according to the present invention.

Shown in FIG. 1 is a cross-sectional side view of a spool 10 on which the fiber 12 of a fiber laser is mounted. The fiber laser is of a standard configuration, having a pump source and appropriate reflection optics (not shown). The fiber itself is doped with an active ingredient, such as ytterbium or some other rare earth material. In the embodiment shown, the fiber is a double-clad fiber, as is known in the art, and is pumped by coupling pumping energy into an inner cladding of the fiber. However, the invention is equally applicable to a single-cladding fiber laser.

Figure 2:
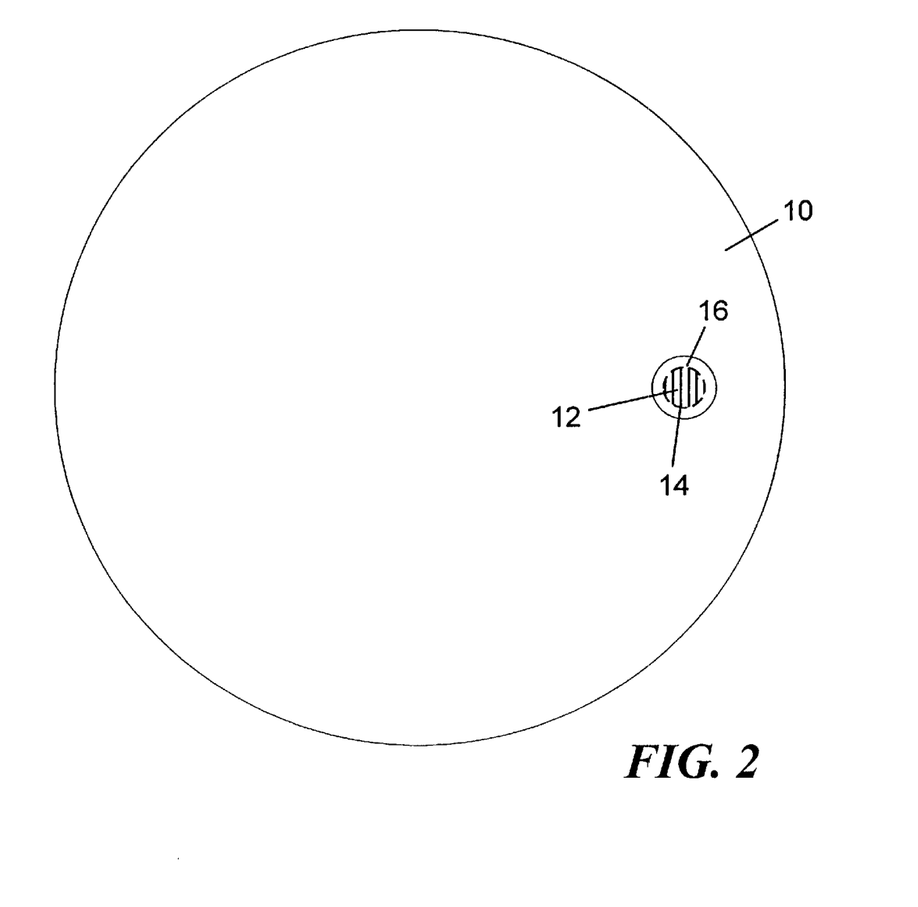
FIG. 2 is a top view of the invention components shown in FIG. 1.

The spool on which the fiber is mounted is much like a conventional spool, except that it has an opening 14 in one side in the vicinity of the fiber 12. Mounted adjacent to the opening 14 on the outside of the spool is a pump light monitor 16, which in the preferred embodiment is a conventional monitor photodiode (MPD). The MPD 16 detects light emitted through the side of the fiber adjacent the opening 14, and the intensity of this light is used as a proportional measurement of the total output power of the system. A top view of the FIG. 1 components is shown in FIG. 2. The area within the broken lines shows the fiber 12 hidden below the MPD 16.

The light detected by the MPD 16 results primarily from scattered optical energy from the fiber 12. This scattered light contains both pump light and signal light. We have determined that this "side" light is useful in determining the overall output power of the laser since, for the range of interest, it is linearly proportional to the total output power. This is demonstrated by the graph of FIG. 3, which shows measured side light in arbitrary units (a.u.) versus output power in watts for a number of different wavelengths. As shown, the side light response is effectively linear for each of the 920 nm and 1110 nm wavelengths. Also demonstrated by this curve is the fact that the side light response is nonlinear for 975 nm. However, the contribution of this wavelength is small enough that the combined response of 920 nm and 975 nm is effectively linear (i.e., any nonlinearity is negligible). Those skilled in the art will recognize that the responses will vary for different doping strategies and different pump wavelengths.

Figure 3:
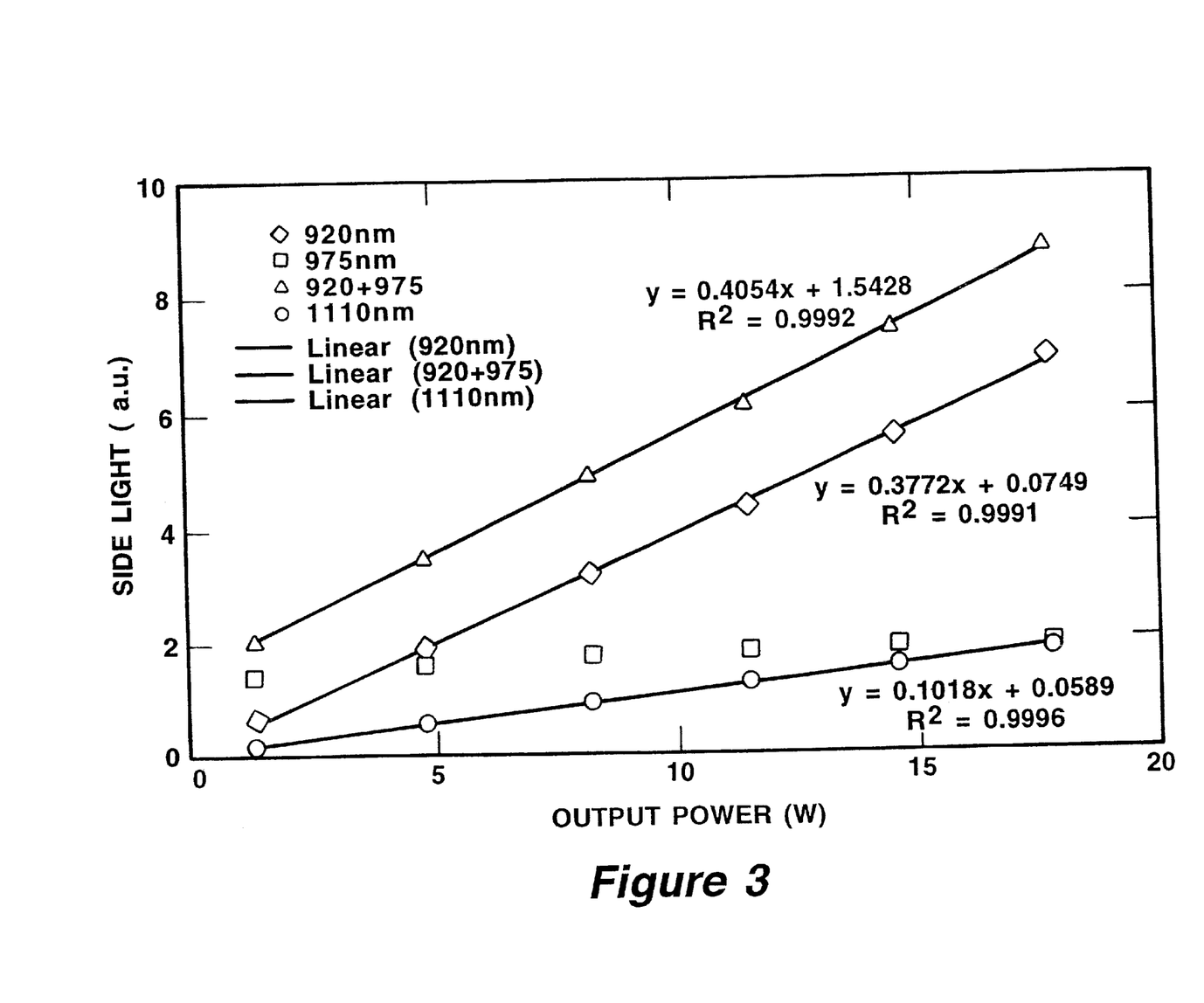
FIG. 3 is a graphical depiction of detected side light versus output power for a system according to the present invention.

However, other similarly linear responses are possible, as are nonlinear relationships that may be calibrated so as to provide a detectable response indicative of relative output power.

Figure 4:
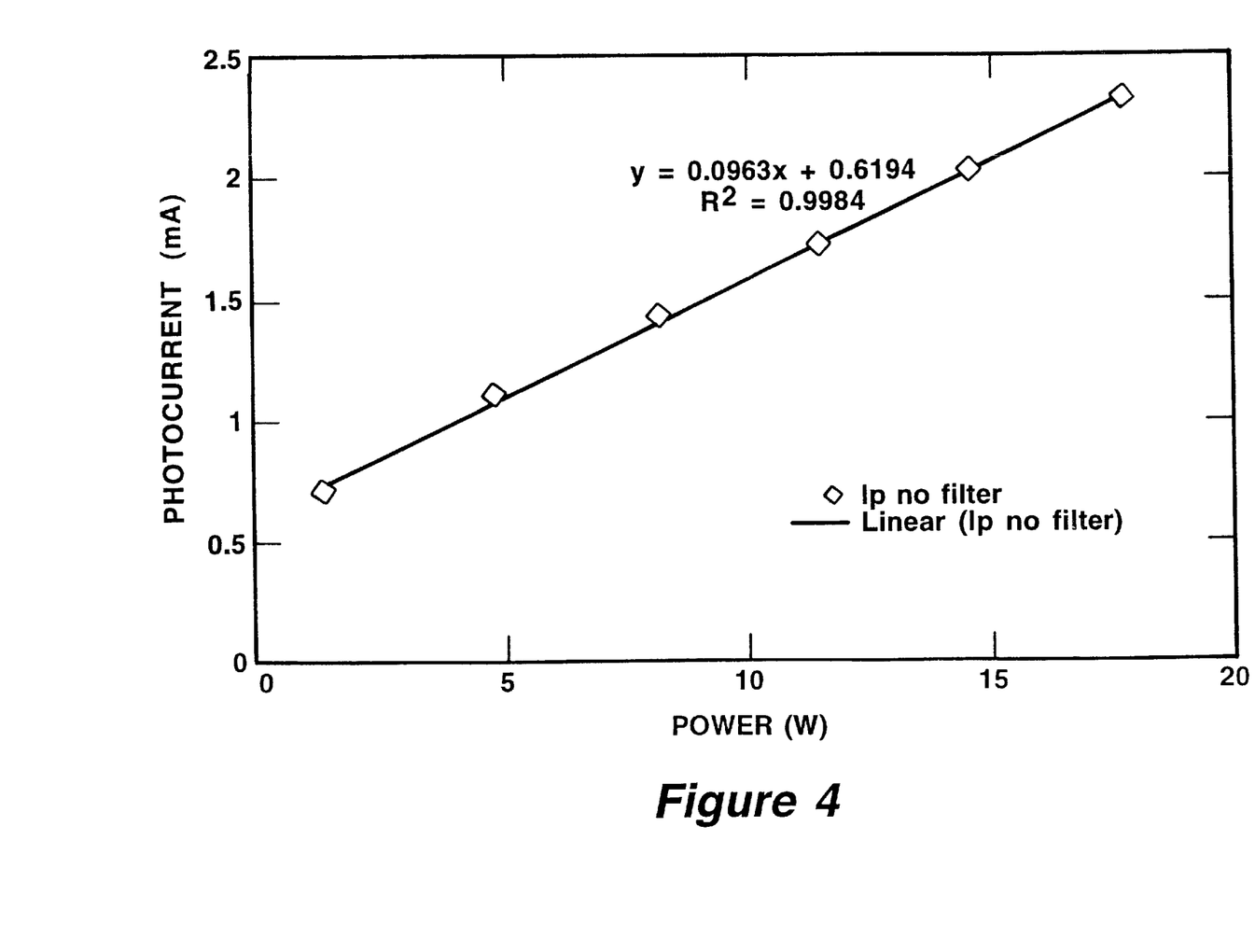
FIG. 4 is a graphical depiction of photodetector current versus output power for a system according to the present invention.

In the preferred embodiment, the MPD 16 is a silicon photodiode model PIN-10DPI produced by UDT sensor in Hawthorne, Calif., or an indium-gallium-arsenide (InGaAs) photodiode model FD1000W produced by Fermionics Opto-technology in SimiValley, Calif. The silicon photodiode has a high responsibility for the 920 nm and 975 nm signals. The InGaAs photodiode has a high responsibility at all the monitored wavelengths. For pump light in the wavelength range of 900–950 nm, the response of each of these detectors is linear. This is demonstrated by the response curve shown in FIG. 4, which depicts photo current in milliamps versus power in watts. As shown, when the laser is pumped by a source having an output in the wavelength range of 900–950 nm, the response of the MPD 16 is linear and in the milliamp range. Thus, the output signal of this detection device is easily used to closely estimate the output power of the laser.

Figure 5:
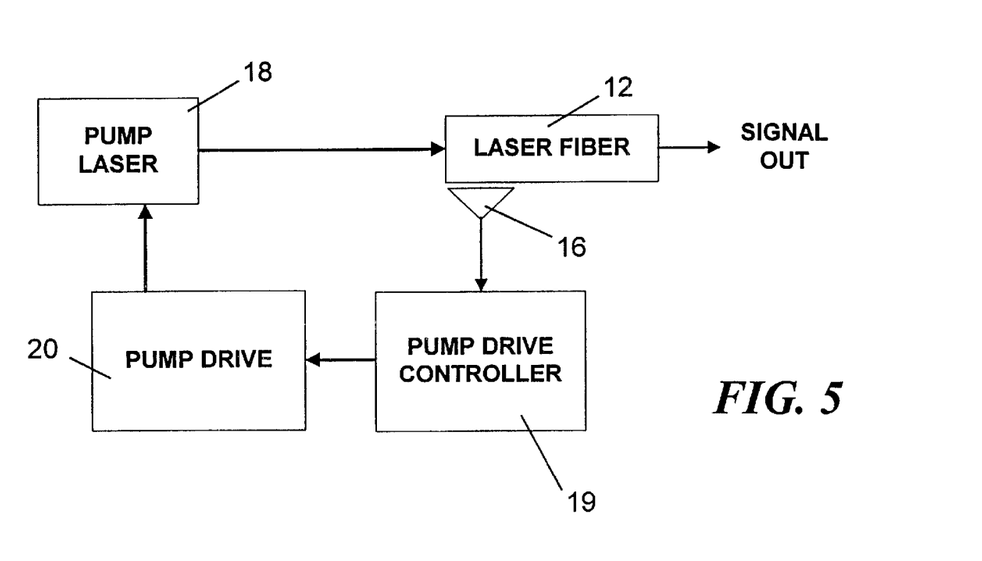
FIG. 5 is a schematic view of a fiber laser system according to the invention.

The block diagram of FIG. 5 depicts an implementation of the invention according to the preferred embodiment. A laser fiber 12 is pumped by a pump laser or lasers 18. This pumping is an introduction of optical energy at a desired wavelength into the inner cladding of the laser fiber. As the laser operates, side light scattered from the laser fiber is detected by MPD 16. An output signal from the MPD that is indicative of the detected power level is directed to pump drive controller 19. The signal output from the MPD may also be used for simply monitoring the laser power. Since the signal is linearly proportional to the laser output power, its magnitude is indicative of the laser power and it may be monitored accordingly.

In the embodiment of FIG. 5, pump drive controller 19 regulates the pump drive 20, which delivers operating power to the pump laser 18. The controller 19 includes an error amplifier that compares the MPD control signal to a set point reference, and a compensation circuit that adjusts the output of the pump drive 20 in response thereto. The pump drive controller 19 adjusts the operating power to the pump laser 18 in response to changes in the input signal from MPD 16 so as to maintain the input signal at a constant, predetermined level. Under this feedback arrangement, when the signal from the MPD 16 to the pump drive decreases, the controller 19 responds by increasing the operating power output by the pump drive 20. This, in turn, results in more pumping energy being delivered to fiber 12, and a corresponding increase in its output and the detected side light signal. When the signal from the MPD 16 to the controller 19 increases, the controller responds by decreasing the operating power output by the pump drive 20. This results in less pump energy being delivered to the fiber 12, and a corresponding drop in the fiber laser output and the detected side light signal. In this way, the output power of the fiber laser is maintained at a constant level.

In an alternative embodiment, the side light detector is used to monitor a fiber optic amplifier. Shown in FIG. 6, amplifier fiber 12 is pumped by pump laser 18 in a manner similar to that described for the fiber laser of FIG. 5. In fact, the fiber, photodetector and spool of FIG. 1 may be used in the same configuration for this embodiment. However, unlike the fiber laser embodiment, no cavity reflectors are used, and a signal to be amplified is injected into the core of the fiber. As the signal is transmitted through the core of the fiber, pump energy is coupled into the inner cladding. The absorption of the pump energy by the doped core results in a population inversion, and subsequent emission of energy at the wavelength of the input signal, as is known in the art. The signal is thereby amplified by an amount determined partially by the amount of pumping energy coupled into the fiber 12.

As it is typically desirable to maintain the fiber amplifier at a fixed signal gain, the MPD 16 is used to monitor side light from the fiber. The output signal from the MPD, indicative of an amount of signal gain in the fiber, is coupled into the pump drive controller 19. As in the fiber laser embodiment of FIG. 5, the controller in FIG. 6 responds to the MPD signal so as to maintain the output of the pump drive 20 at a constant level. Thus, the controller 19 and pump drive 20 cause the output from the pump laser 18 to increase when the MPD signal indicates that the power in the amplifier has dropped below a predetermined level. Similarly, the controller 19 and pump drive 20 cause the output from the pump laser 18 to decrease when the MPD signal indicates that the power in the amplifier has risen above a predetermined level.

Figure 7:
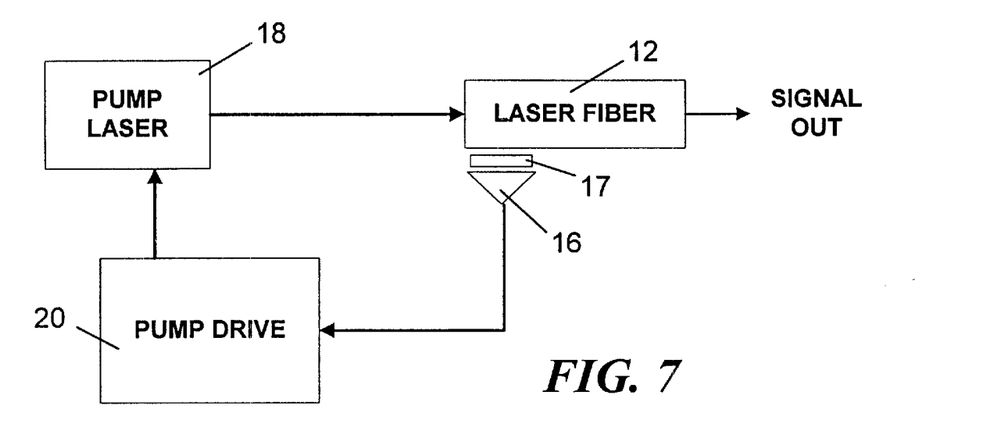
FIG. 7 is a schematic view of a laser apparatus that is similar to that of FIG. 5, but that filters the side light prior to its detection.

Shown in FIG. 7 is an alternative embodiment of the invention. In this embodiment, an InGaAs detector is used in conjunction with a wavelength-selective filter 17 that blocks the 920 nm and 975 nm signals, but passes the 1110 nm laser wavelength. The functioning of the device is essentially the same as that shown in FIG. 5. However, the monitor signal shows less change with time during the few minutes after the laser is turned on, as compared with the other monitor wavelengths. This is attributed to the fact that the pump output will typically change as the temperature increases during an initial warm-up period. Thus, exclusion of the pump wavelength range with the filter 17 reduces the instability of the detected side light signal.

In a variation of the filtered embodiment shown in FIG. 7, the wavelength range of the signal is blocked by the filter 17, rather than the pump wavelength. That is, the 1110 nm wavelength is blocked while the 920 nm is passed. The 975 nm wavelength may also be blocked if the filter characteristic is sharp enough to exclude the 975 nm wavelength without significantly reducing the magnitude of the 920 nm wavelength. As mentioned above, the use of the pump wavelength for monitoring may be limited by its instability during a warm-up phase. However, use of side light at the pump wavelength allows direct monitoring of the pump output. Thus, if the signal wavelength was no longer indicative of the pumping power (e.g., if a break occurred in the laser fiber), the total pumping power could not be monitored. In such a case, a break in the fiber could result in the pump output being driven too high. By monitoring side light at the pump wavelength, such a situation could be avoided.

Figure 8:
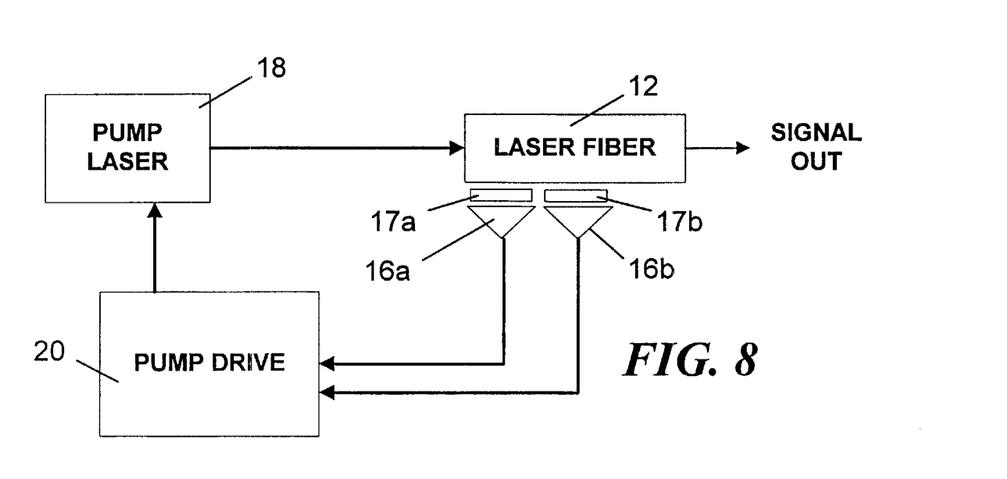
FIG. 8 is a schematic view of a laser apparatus similar to that of FIG. 7 that includes multiple filters to separate pump wavelengths and signal wavelengths in the detected side light for individual use by the controller.

Shown in FIG. 8 is an embodiment similar to that of FIG. 7. However, in this embodiment, the side light from the fiber is filtered and detected separately using two different characteristics. The filter 17a excludes light in the range of the pump wavelength. Thus, the signal detected by MPD 16a is indicative of the signal power within the laser fiber 12. At the same time, filter 17b excludes light in the wavelength range of the pump signal. Thus, MPD 16b generates a signal indicative of the pump power within laser fiber 12. Outputs from each of these MPDs are shown connected to pump drive 20. By using both signals in this manner, either or both of the MPD output signals may be used to determine the laser output power, and the signal from MPD 16b may be used to ascertain the pump power within the laser fiber.

Figure 6:
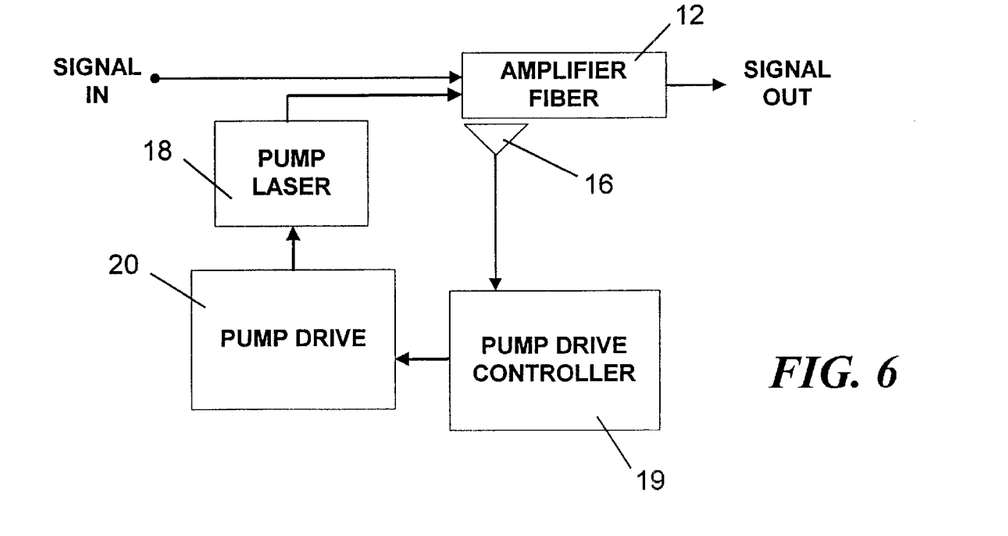
FIG. 6 is a schematic view of a fiber optic amplifier system according to the invention.

Those skilled in the art will recognize that the filter embodiments described in conjunction with FIGS. 7 and 8 are equally applicable to use with a fiber optic amplifier, such as that shown in FIG. 6. Moreover, while the detection of particular wavelength ranges are shown in these figures as making use of separate filter and detection devices, detection devices that are limited to a specific, desired wavelength range might also be used, thereby removing the need for a separate filter. Moveover, for the multiple wavelength range detection embodiment of FIG. 8, other arrangements of detection devices in filters may be used, provided independent detection of each wavelength range is provided.

It will also be recognized by those skilled in the art that other embodiments of the invention are possible using gain media having different wavelength characteristics. For example, a fiber optic laser that uses an erbium-ytterbium doping arrangement would have different wavelength gain characteristics, and therefore different necessary detection wavelengths. For example, using such a doping profile would result in absorption of the 975 nm wavelength by the erbium dopant. As mentioned above, it is also possible to use the signals from the detectors for the various embodiments to simply monitor the output power and/or pump power of any of the laser and or amplifier embodiments, rather than using it to actually control the pump drive output.

While the invention has been shown and described with reference to a preferred embodiment thereof, it will be recognized by those skilled in the art that various changes in form and detail may be made herein without departing from the spirit and scope of the nvention as defined by the appended claims.

What is claimed is:

1. An optical gain system comprising:

an optical fiber that has a core and multiple claddings and that responds to optical pumping energy at a pump wavelength by generating optical signal energy at a signal wavelength;

an optical pumping source that generates optical pump energy at the pump wavelength and couples it into the optical fiber cladding;

a photodetector that detects side light scattered through the fiber cladding and generates a control signal indicative of the side light power level, the side light comprising scattered pumping energy; and a controller that receives the control signal and adjusts the power output from the pumping source to the optical fiber in response thereto such that the detected side light is maintained at a substantially constant power level.

2. An optical gain system comprising:

a double clad optical fiber that has a core, an inner cladding and an outer cladding, and that responds to optical pumping energy at a pump wavelength by generating optical signal energy at a signal wavelength;

an optical pumping source that generates optical pump energy at the pump wavelength and couples it into the inner cladding;

a photodetector that detects side light emitted through the fiber cladding and generates a control signal indicative of the side light power level; and a controller that receives the control signal and adjusts the power output from the pumping source to the optical fiber in response thereto such that the detected side light is maintained at a substantially constant power level.

3. An optical gain system according to claim 1 wherein the fiber is doped with at least one rare earth element.

4. An optical gain system according to claim 3 wherein the rare earth element is ytterbium.

5. An optical gain system according to claim 1 further comprising a spool upon which the fiber is mounted, the spool having an opening adjacent the fiber through which the side light passes.

6. An optical gain system according to claim 5 wherein the photodetector resides adjacent to the opening in the spool.

7. An optical gain system according to claim 1 wherein the gain system comprises a fiber laser.

8. An optical gain system according to claim 1 wherein the gain system comprises an optical amplifier.

9. An optical gain system according to claim 1 further comprising a wavelength-selective filter that prevents detection by the photodetector of certain predetermined wavelengths in the side light.

10. An optical gain system according to claim 1 wherein the detected side light is substantially proportional to a power level of said optical signal energy in the fiber.

11. An optical gain system according to claim 10 wherein said proportionality is a direct proportionality.

12. An optical gain system according to claim 1 wherein the detected side light is substantially proportional to a power level of said pump energy in the fiber.

13. An optical fiber laser comprising:
an optical fiber that has a core doped with a rare earth element and multiple claddings, and that responds to optical pumping energy at a pump wavelength by generating optical signal energy at a signal wavelength;
a spool upon which the fiber is mounted, the spool having an opening adjacent to the fiber through which the side light passes;
an optical pumping source that generates optical pump energy at the pump wavelength and couples it into an inner cladding;
a photodetector that is located adjacent to the opening in the spool and that detects side light emitted through the fiber cladding, the side light comprising scattered pumping energy, and wherein the photodetector generates a control signal indicative of the side light power level; and
a controller that receives the control signal and adjusts the power output from the pumping source to the optical fiber in response thereto such that the detected side light is maintained at a substantially constant power level.

14. A method of stabilizing the power in an optical gain system having an optical fiber with a core and multiple claddings, and that responds to optical pumping energy at a pump wavelength by generating optical signal energy at a signal wavelength, the method comprising:
generating optical pump energy with an optical pumping source and coupling it into an inner cladding of the optical fiber;
detecting side light emitted from the fiber with a photodetector and generating a control signal indicative of the side light power level, the side light comprising scattered pump energy; and
monitoring the control signal and adjusting the power output from the pumping source to the optical fiber in response thereto such that the detected side light is maintained at a substantially constant power level.

15. A method of stabilizing the power in an optical gain system having a double clad optical fiber with a core, an inner cladding and an outer cladding, the fiber responding to optical pumping energy at a pump wavelength by generating optical signal energy at a signal wavelength, the method comprising:
generating optical pump energy with an optical pumping source and coupling it into the inner cladding;
detecting side light emitted through the fiber cladding with a photodetector and generating a control signal indicative of the side light power level; and
monitoring the control signal and adjusting the power output from the pumping source to the optical fiber in response thereto such that the detected side light is maintained at a substantially constant power level.

16. A method according to claim 14 wherein the fiber is doped with at least one rare earth element.

17. A method according to claim 16 wherein the rare earth element is ytterbium.

18. A method according to claim 14 further comprising locating the fiber on a spool that has an opening adjacent the fiber through which the side light passes.

19. A method according to claim 18 further comprising locating the photodetector adjacent to the opening in the spool.

20. A method according to claim 14 wherein the gain system comprises a fiber laser.

21. A method according to claim 14 wherein the gain system comprises an optical amplifier.

22. A method according to claim 14 further comprising filtering the side light with a wavelength-selective filter that prevents detection by the photodetector of certain predetermined wavelengths n the side light.

23. A method of operating an optical gain system having an optical fiber with a core and multiple claddings, and that responds to optical pumping energy at a pump wavelength by generating optical signal energy at a signal wavelength, the method comprising:
generating optical pump energy with an optical pumping source and coupling it into an inner cladding of the optical fiber; and
monitoring side light emitted from the fiber with a photodetector and generating a monitor signal indicative of the side light power level, the side light comprising scattered pump energy.

24. A method of operating an optical gain system having a double clad optical fiber with a core, an inner cladding and an outer cladding, the fiber responding to optical pumping energy at a pump wavelength by generating optical signal energy at a signal wavelength, the method comprising:
generating optical pump energy with an optical pumping source and coupling it into the inner cladding; and
monitoring side light emitted through the fiber cladding with a photodetector and generating a monitor signal indicative of the side light power level.

25. A method according to claim 23 wherein the fiber is doped with at least one rare earth element.

26. A method according to claim 25 wherein the rare earth element is ytterbium.

27. A method according to claim 23 further comprising locating the fiber on a spool that has an opening adjacent the fiber through which the side light passes.

28. A method according to claim 27 further comprising locating the photodetector adjacent to the opening in the spool.

29. A method according to claim 23 wherein the gain system comprises a fiber laser.

30. A method according to claim 23 wherein the gain system comprises an optical amplifier.

31. A method according to claim 23 further comprising filtering the side light with a wavelength-selective filter that prevents detection by the photodetector of certain predetermined wavelengths in the-side light.

32. A method of stabilizing the power of an optical fiber laser that has an optical fiber with a core doped with a rare earth element and multiple claddings, and that responds to optical pumping energy at a pump wavelength by generating optical signal energy at a signal wavelength, the method comprising:
locating the fiber on a spool having an opening adjacent the fiber through which the side light passes;
coupling optical pump energy at the pump wavelength into an inner cladding of the fiber;
detecting side light emitted from the fiber and generating a control signal indicative of the side light power level, the side light comprising scattered pump energy; and
monitoring the control signal and adjusting the optical pump energy coupled into the inner cladding in response thereto such that the detected side light is maintained at a substantially constant power level.

* * * * *

UNITED STATES PATENT AND TRADEMARK OFFICE
CERTIFICATE OF CORRECTION

PATENT NO.    : 6,424,663 B1
DATED         : July 23, 2002
INVENTOR(S)   : Fidric et al.

It is certified that error appears in the above-identified patent and that said Letters Patent is hereby corrected as shown below:

Column 8,
Line 6, "wavelengths n the" should read -- wavelengths in the --
Line 47, "wavelengths in the-side" should read -- wavelengths in the side --

Signed and Sealed this

Nineteenth Day of November, 2002

Attest:

Attesting Officer

JAMES E. ROGAN
Director of the United States Patent and Trademark Office